Nov. 9, 1965  E. S. STEVENS ETAL  3,216,037
LANE MAINTENANCE MACHINE
Filed Dec. 18, 1962  11 Sheets-Sheet 9
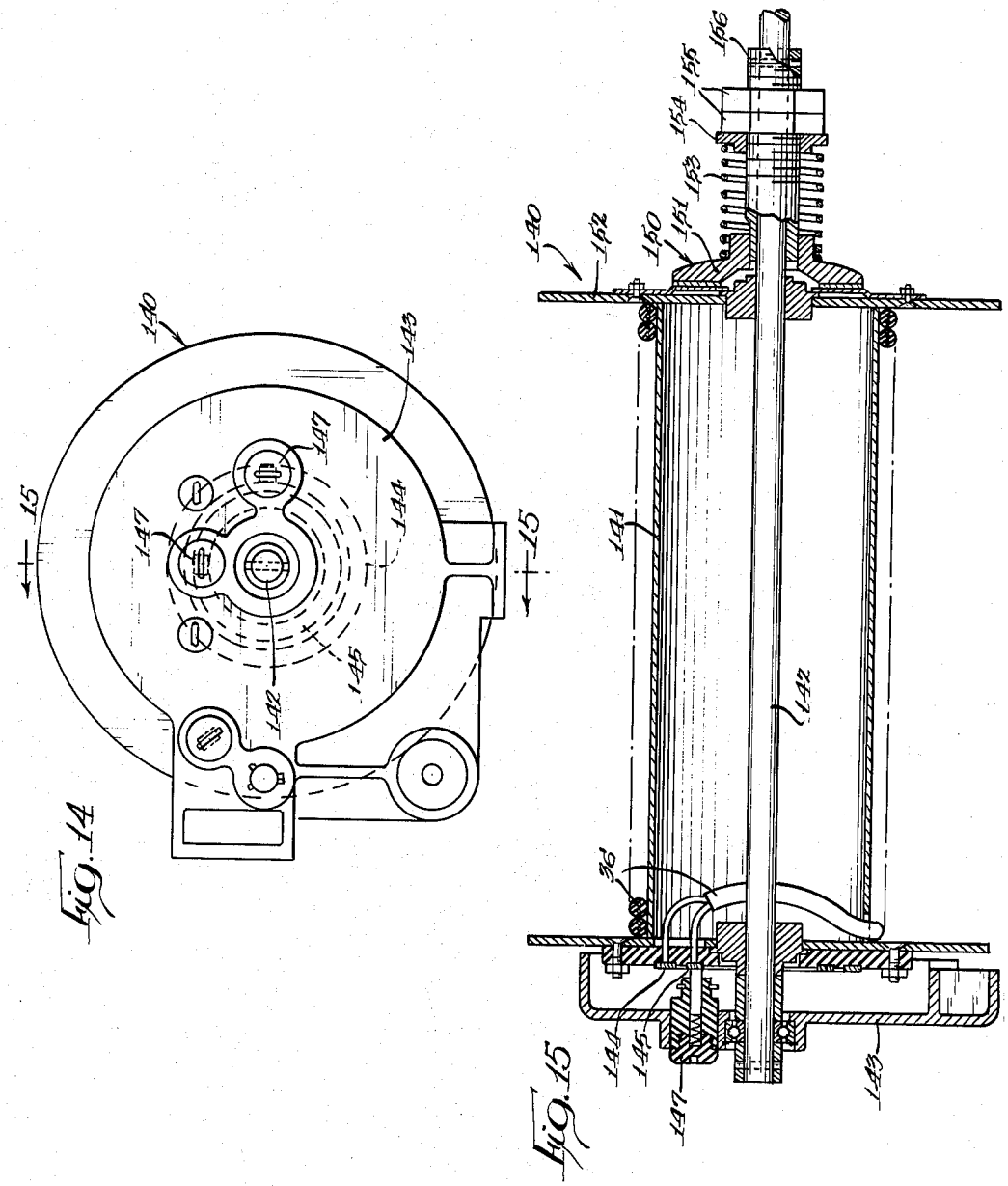

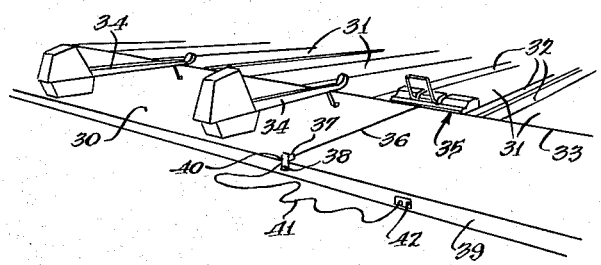
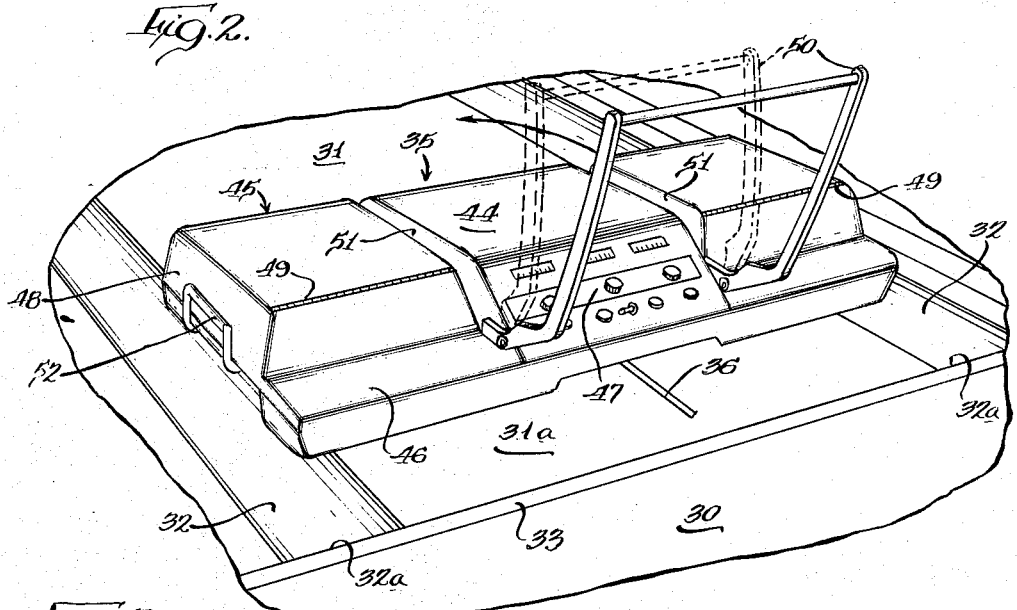
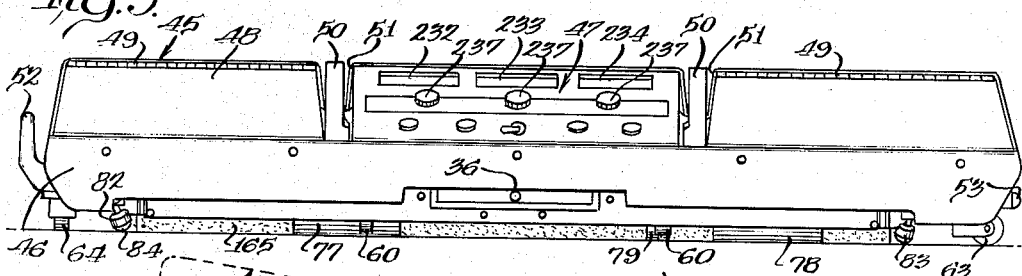
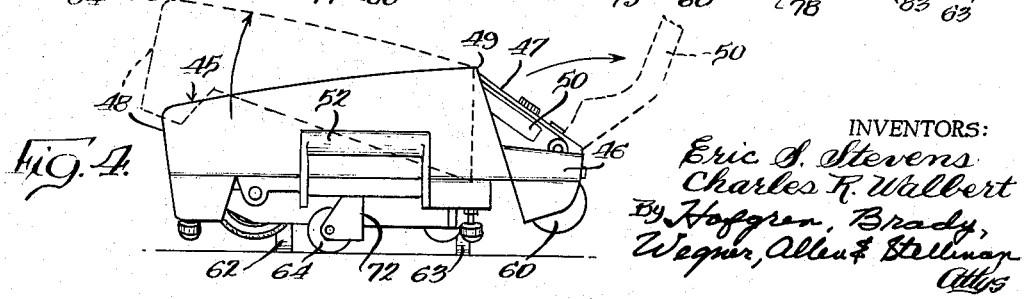

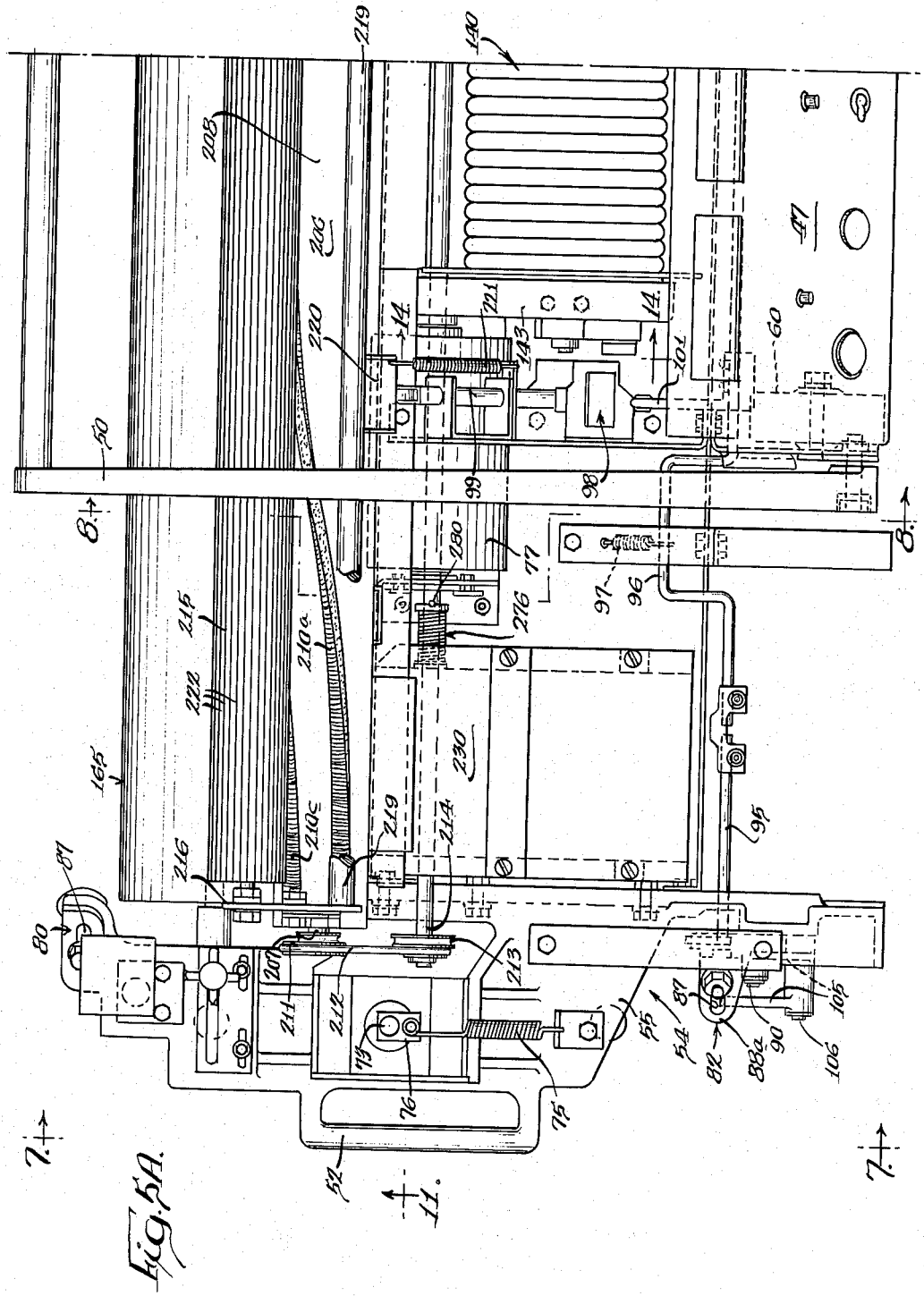

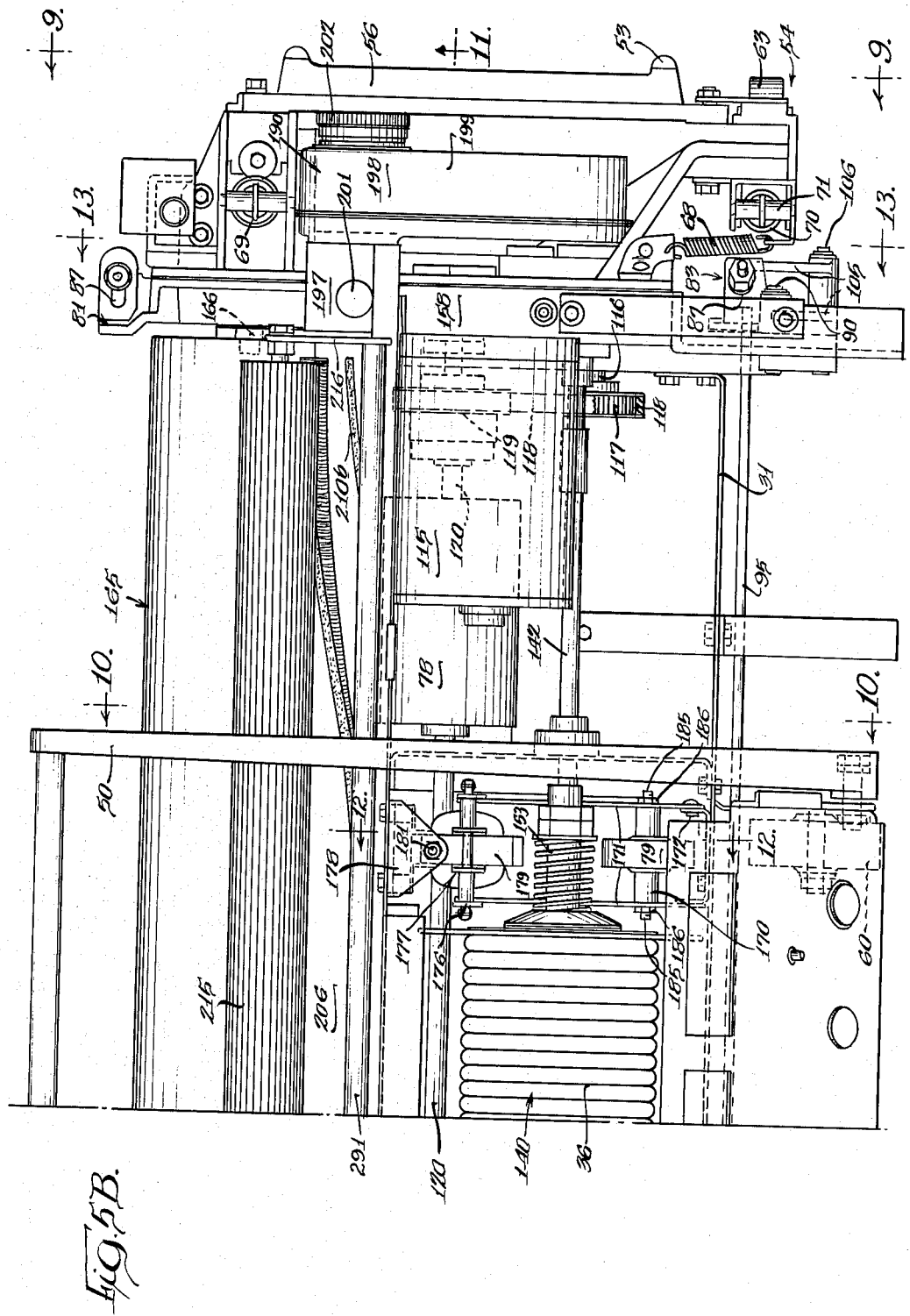

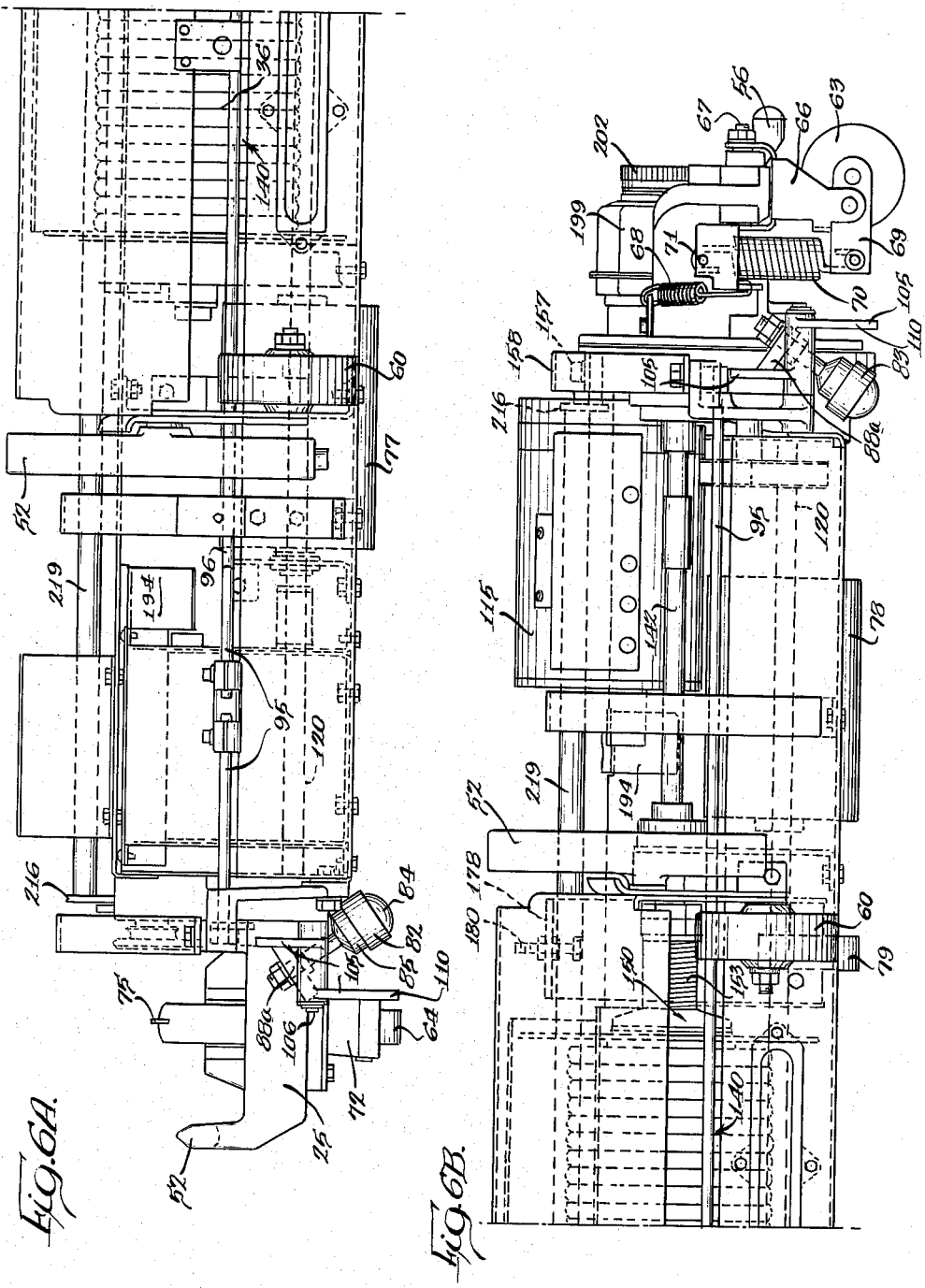

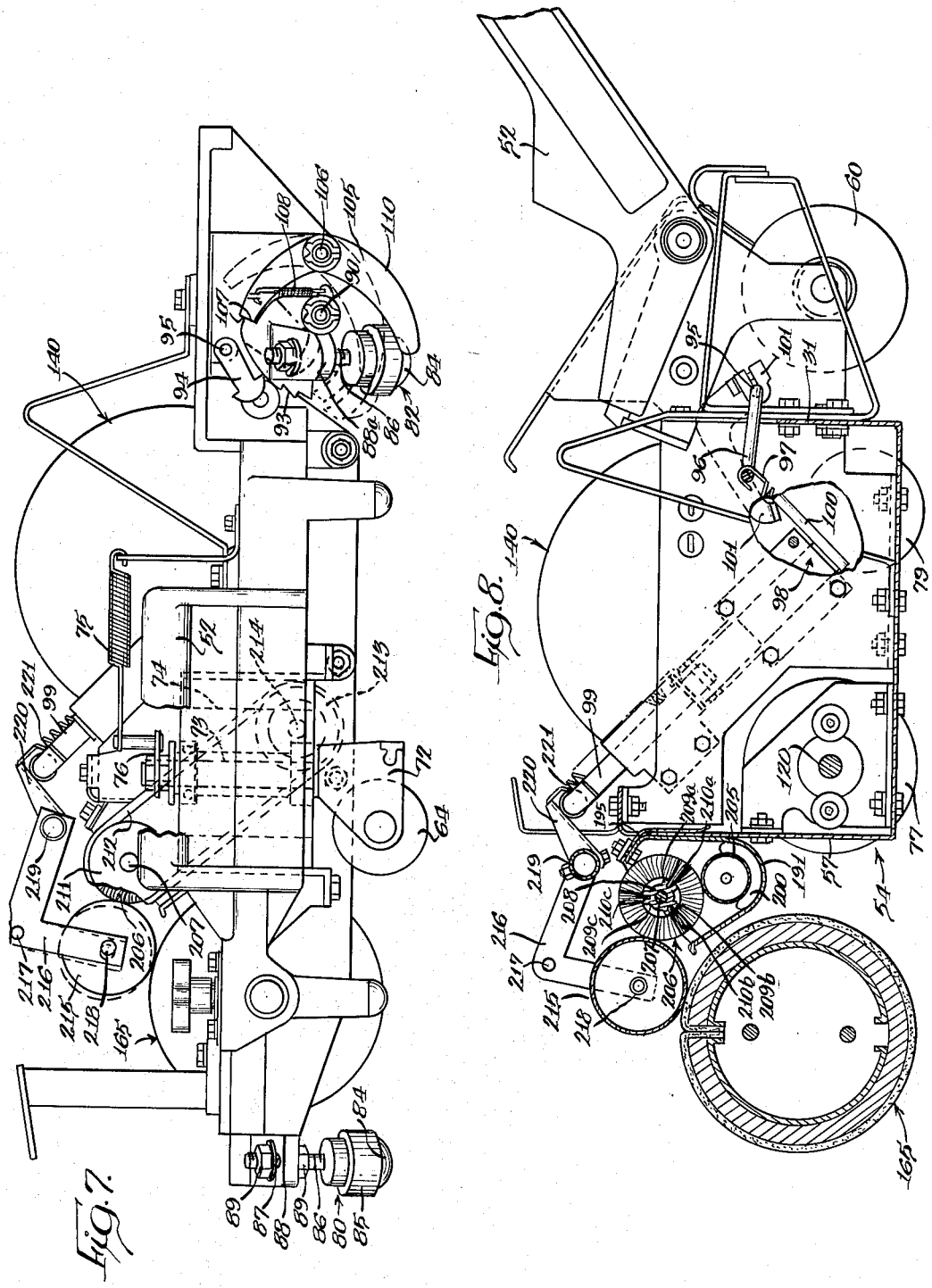

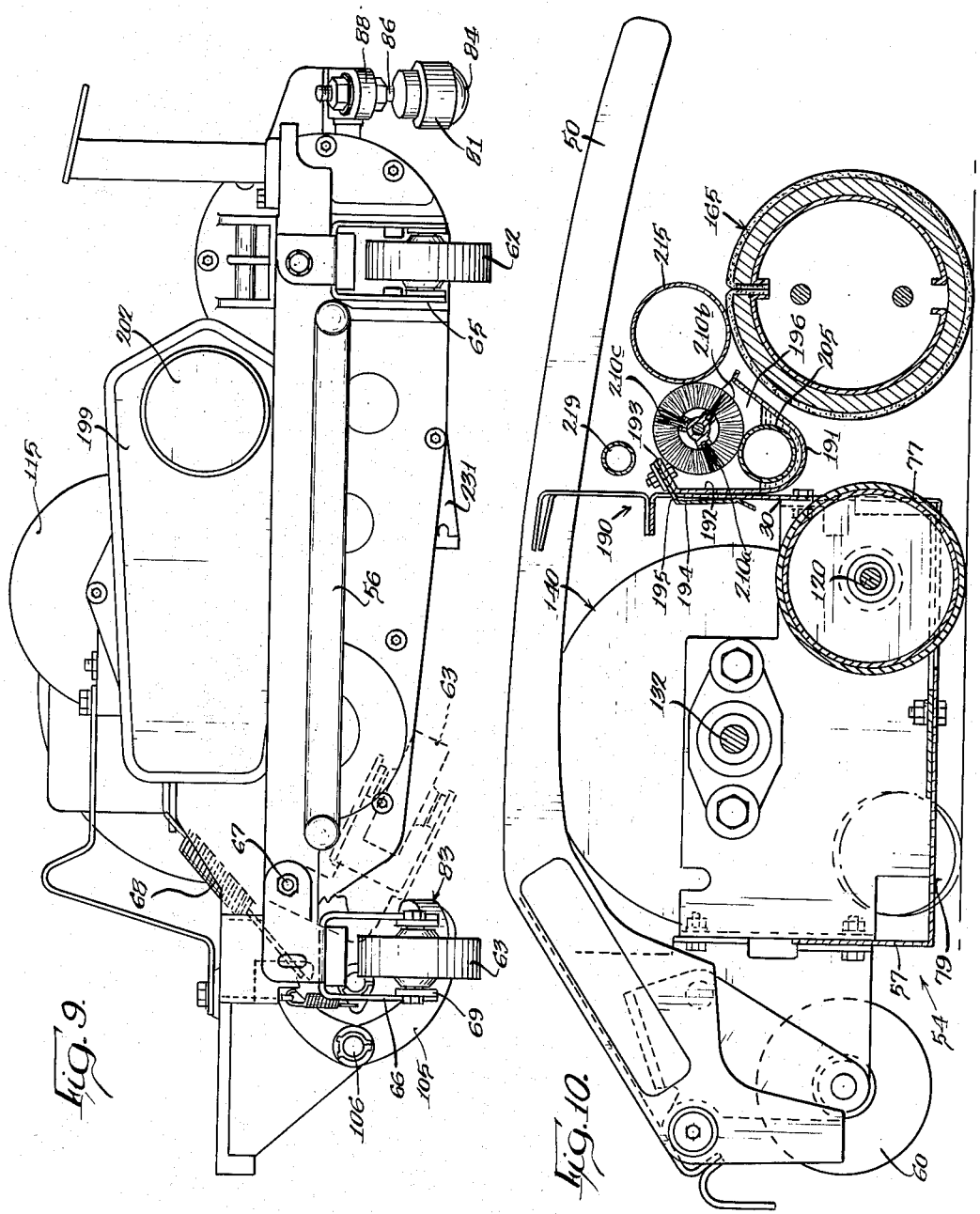

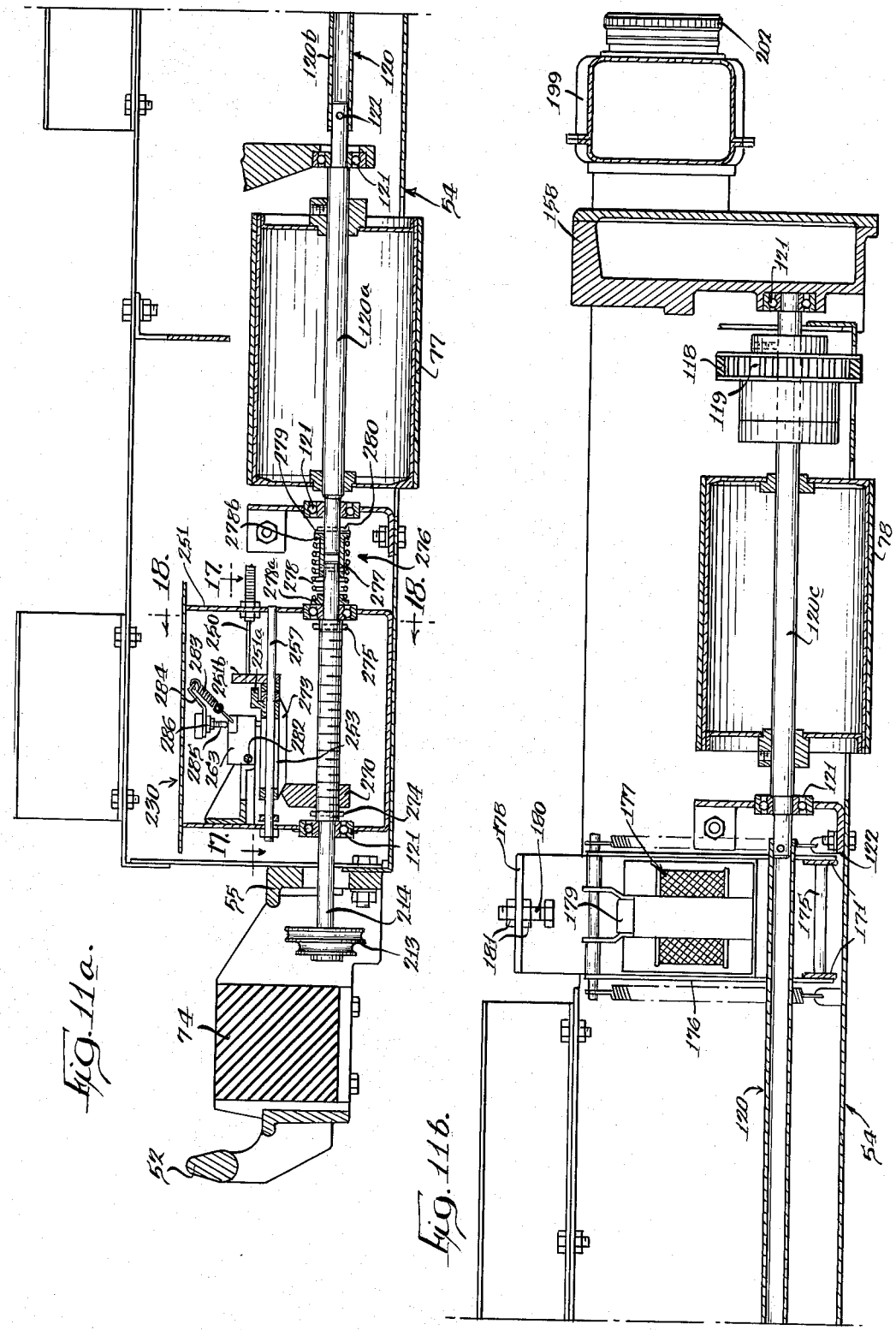

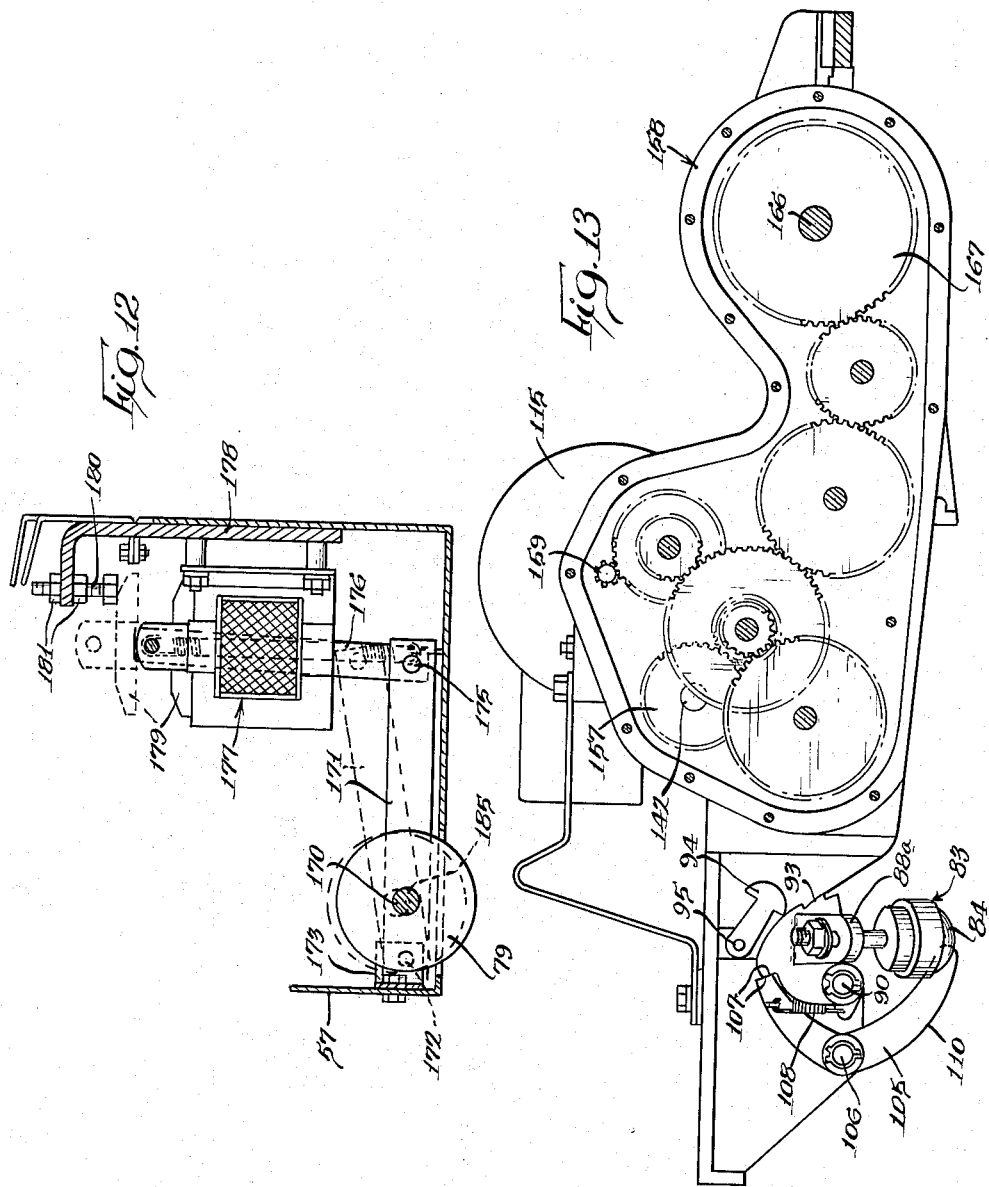

United States Patent Office 3,216,037
Patented Nov. 9, 1965

3,216,037
LANE MAINTENANCE MACHINE
Eric S. Stevens and Charles R. Walbert, Muskegon, Mich., assignors to Brunswick Corporation, a corporation of Delaware
Filed Dec. 18, 1962, Ser. No. 245,611
15 Claims. (Cl. 15—98)

This invention relates to a maintenance machine and especially to a machine suited for conditioning bowling lanes, and to components thereof.

A primary object of this invention is to provide a new and useful machine for conditioning bowling lanes.

Adequate maintenance of bowling alleys is highly important in the operation of a successful establishment. Such maintenance is important not only in building and maintaining a profitable clientele but is also important in preserving the alleys and avoiding substantial outlay for major repairs or replacement. Various lane maintenance machines are available, but most such machines are generaly ineffective in properly treating and conditioning a bowling lane, or they lack adequate automation and flexibility.

An important object of this invention is to provide a new and useful lane maintenance machine which is suitably automatic, flexible and effective in properly conditioning bowling alleys.

Related objects include provision of new and useful components of such a machine, such as running gear facilitating movement of the machine, lane conditioner fluid supply and transfer mechanism, and automatic control mechanism.

Another object is to provide a new and useful lane maintenance machine, and components thereof, which automatically moves down the alley and returns to the foul line, and concurrently automatically conditions the alley.

A further object is provision of a new and useful lane maintenance machine, and components thereof, for automatically applying conditioning material to the bed of a bowling lane and buffing the bed.

Other objects and advantages of the invention will become readily apparent from the following description taken in connection with the accompanying drawings, in which:

FIG. 1 is a fragmentary perspective view of the players' end of a bowling alley installation, with apparatus embodying the present invention positioned on the bowling lane;

FIG. 2 is an enlarged fragmentary perspective view of a portion of FIG. 1 illustrating in greater detail part of the apparatus in the form of a lane conditioning machine;

FIG. 3 is a rear elevational view of the machine;

FIG. 4 is a left side elevational view of the machine;

Figure 16:
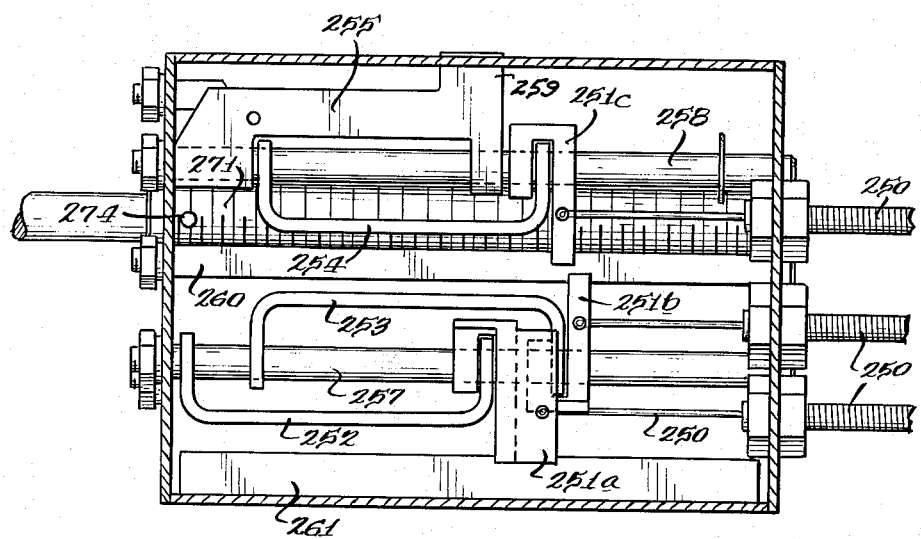
Figure 17:
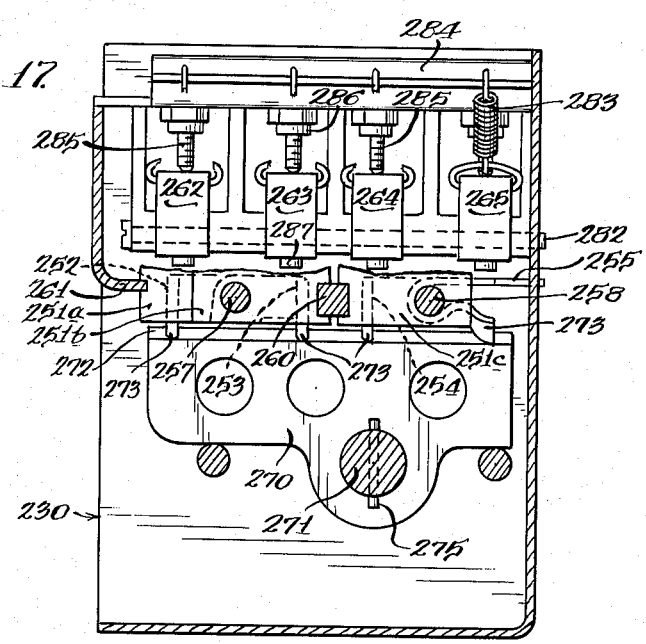
Figure 18:
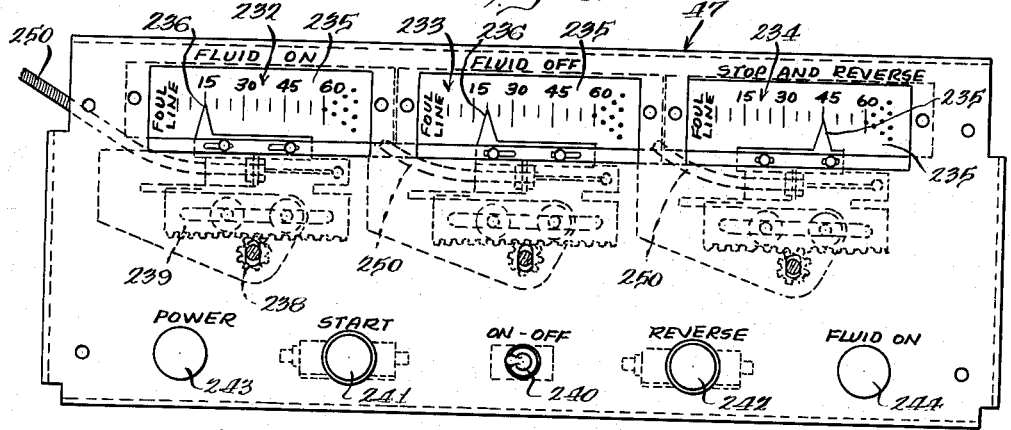
Figure 19:
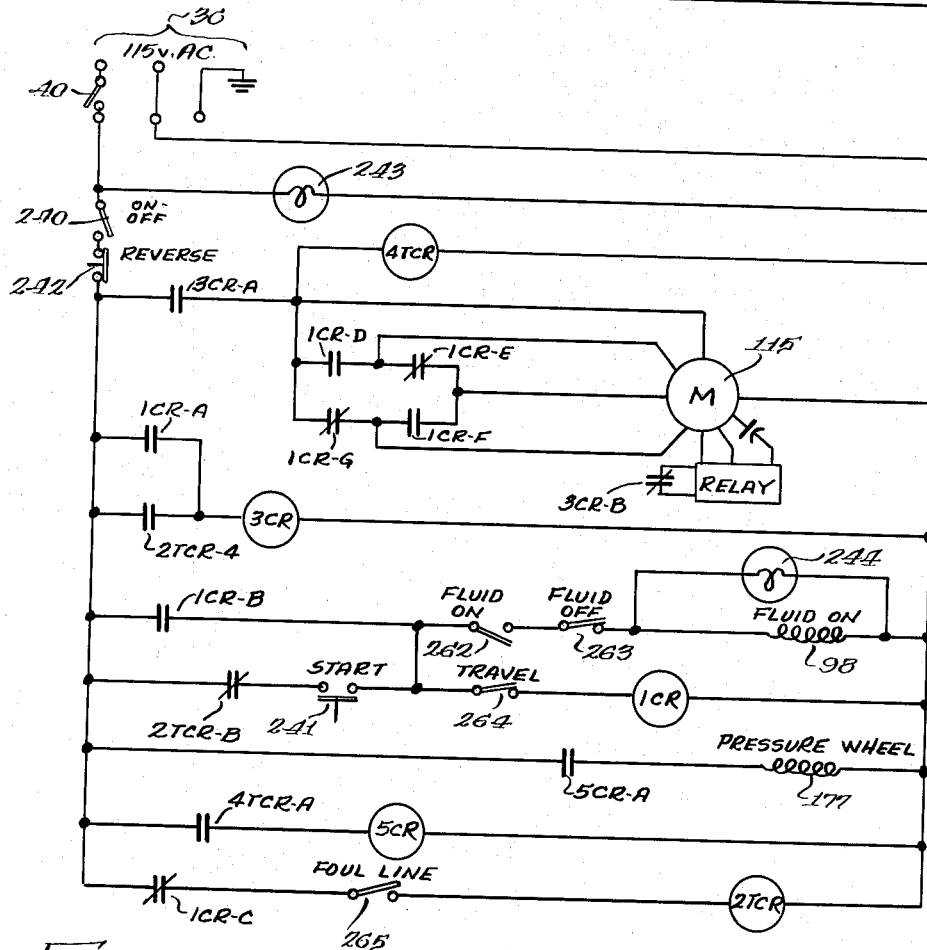

FIGS. 5A and 5B constitute an enlarged top plan view of the machine, the two views being complementary halves, FIG. 5A illustrating the left-end portion of the machine, and FIG. 5B illustrating the right-end portion of the machine, with parts broken away for clearer illustration;

FIGS. 6A and 6B similarly constitute a rear elevational view of the machine;

FIG. 7 is an enlarged left side elevational view, taken generally along the line 7—7 of FIG. 5A, with a cover of the machine removed, and illustrating an embodiment of the lane conditioner fluid transfer mechanism;

FIG. 8 is an enlarged, fragmentary, sectional view, taken generally along the line 8—8 of FIG. 5A, with the cover removed;

FIG. 9 is an enlarged right-end elevational view taken generally along the line 9—9 of FIG. 5B with the cover removed;

FIG. 10 is an enlarged sectional view taken generally along the line 10—10 of FIG. 5B with the cover removed;

FIGS. 11A and 11B constitute a transverse sectional view similar to, and taken generally along the line 11—11 of FIGS. 5A and 5B, respectively, and illustrate machine propelling mechanism and control mechanism;

FIG. 12 is an enlarged fragmentary sectional view taken generally along the line 12—12 of FIG. 5B;

FIG. 13 is an enlarged sectional view taken generally along the line 13—13 of FIG. 5B;

FIG. 14 is an enlarged sectional view taken generally along the line 14—14 of FIG. 5A, and illustrates a cord reel assembly of the machine;

FIG. 15 is a sectional view taken generally along the line 15—15 of FIG. 14;

FIG. 16 is an enlarged fragmentary sectional view of part of the control mechanism as taken generally along the line 16—16 of FIG. 11A;

FIG. 17 is an enlarged fragmentary sectional view of the control mechanism of FIG. 16 as taken generally along the line 17—17 of FIG. 11A;

FIG. 18 is an enlarged fragmentary rear elevational view illustrating a control panel of the machine; and FIG. 19 is a wiring diagram illustrating a preferred control circuit for automatic operation of the machine.

While illustrative embodiments of the invention are shown in the drawings and will be described in detail herein, the invention is susceptible of embodiment in many different forms, and it should be understood that the present disclosure is to be considered as an exemplification of the principles of the invention and is not intended to limit the invention to the embodiments illustrated. The scope of the invention will be pointed out in the appended claims.

The invention is, in brief, directed to a new and useful lane maintenance machine particularly suited for use in conditioning bowling alley beds. The machine includes a chassis with running gear means in the form of a working running gear here including wheels providing for powered propulsion of the machine up and down a bowling alley, and handling running gear means facilitating manual manipulation as for tilting the machine on end in storage position, moving the machine to and from the bowling alley lanes, and orienting the machine at the bowling alley foul line.

Guide means is provided for maintaining the machine properly oriented as it traverses the bowling alley, and this means as shown herein includes guides seated against gutters on either side of the bed. Means is provided for holding certain guides retracted until they have cleared gutter heads at the foul line and can be properly received in the gutters, and other means is provided for retraction of these guides as the machine returns to the foul line.

Drive means for the working running gear includes a suitable source of power such as an electric motor connected with driving wheels. Means for connecting the eletric motor with a suitable source of electric power includes a reel mounted on the chassis for handling the electric extension cord. The reel pays out the cord as the machine moves down the alley, and as the machine reverses and moves back toward the foul line the reel automatically reels in the cord.

Conditioner means, illustrated in the form of a conditioner roll, is mounted on the front end of the chassis for buffing the bowling alley bed. This roll may be retained out of engagement with the bowling alley bed when the machine is standing still, so as to avoid forming a line across the bed, and mechanism is provided for automatically moving the roll into and out of operative conditioning association with the bed. In the illustrated embodiment, this means is in the form of a tilt or pressure wheel of the working running gear which tilts the chassis relative to the alley surface facilitating contact of the roll with the bed or elevation of the roll slightly above the bed. Means is also provided for dispensing conditioner fluid for the bowling alley bed. In the illustrated embodiment, this means is in the form of a reservoir for conditioner liquid and a trough extending in one direction from the reservoir for providing conditioner liquid to a pick-up roll rotatable within the trough. Means is provided for transferring liquid from the pick-up roll to an applicator roll which then transfers the liquid to the conditioner roll. This transfer means facilitates applying varying concentrations of liquid longitudinally of the conditioner roll and laterally of the bowling lane so that certain portions of the lane receive different amounts of liquid depending on the requirements of the lane. The trough and reservoir assembly is such that when the chassis is tilted, as on end, the conditioner liquid flows from the trough back into the reservoir to avoid any spillage. Control means is provided for automatically controlling operation of the machine, and in the illustrated embodiment this control means includes a novel control unit.

While the present invention is illustrated and described in the form of a lane maintenance machine for applying conditioner liquid to a bowling alley bed and buffing the bed, it should be understood that the machine and various portions thereof are suited to numerous other uses, for example, sanding or merely dusting a bowling alley, and to environments other than bowling alleys, as will be obvious to one skilled in the art.

The bowling alley

With particular reference to FIG. 1 of the drawings, the approach or players' end of a bowling alley installation usually includes a slightly elevated platform 30 leading to a plurality of bowling lanes 31, each having a bed 31a with suitable gutters 32 on either side of each bed with head ends 32a at a foul line 33 separating platform 30 and each lane 31. Suitable ball racks 34 are provided, one usually serving a pair of adjacent alleys, and in the illustrated embodiment racks 34 receive bowling balls from a return track below the level of lanes 31.

The machine

A machine 35 for conditioning the lanes 31 is connected by a suitable electric cord 36 to an anchor or control box 37 removably seated on platform 30 and having a depending flange 38 engaging a vertical rear edge 39 of the platform. Box 37 has a suitable connector releasably holding electric cord 36 and electrically connecting the cord through a switch 40 (FIG. 19) with an electric cord 41 extending from the box to a suitable electric outlet 42 preferably provided in edge 39 of the platform.

With reference to FIGS. 2–4, the lane conditioning machine 35 will be seen to have a housing 45 including a fixed portion 46 carrying a control panel 47, and an access cover 48 connected by hinges 49 to the top edge of fixed casing portion 46 for pivotal movement from a normal operative closed position, as shown in FIG. 2, to a generally vertical open position for servicing the machine. A rear handle 50 is provided pivotally mounted on the chassis for moving the machine generally forwardly and rearwardly, and in FIG. 2 this handle is shown in solid lines in its normal operative position from which it may be folded downwardly to a retracted position nested in grooves 51 in the casing, as when the machine is conditioning a bowling alley lane 31. A side handle 52 is provided on the left side of the machine as shown in FIGS. 2 and 3 so that the left side of the machine may be tilted upwardly for movement generally sideways, and for setting the machine in storage position on its right side, for which purpose bumper 53 extends outwardly from the right side of the machine.

With particular reference to FIGS. 5A–10, the machine includes a chassis 54 having a left side member 55 and a right side member 56, preferably of rigid cast construction, with these side members firmly interconnected by a generally U-shaped body member 57, preferably of rigid sheet metal construction, as may best be seen in FIGS. 8 and 10. Various appendages are provided on the chassis for suitably mounting components to be described, and it should be understood that the chassis may be of any suitable nature providing a base for mounting other parts of the machine.

Running gear

Running gear means is provided for supporting and moving the machine. In the illustrated embodiment the running gear means is particularly suited for using the machine in a bowling alley establishment and includes handling running gear means for handling the machine and moving it about as from lane to lane, and working running gear on which the machine moves up and down a lane 31.

The handling running gear includes means for moving the machine generally forwardly and rearwardly, and other means for moving the machine generally sideways and effecting storage of the machine. It should be understood that these running gears permit other than straight line movement of the machine, but facilitate easy moving of the machine in the intended directions. In order to handle the machine in moving it forwardly and rearwardly, a pair of rear wheels 60 is provided (FIGS. 6A, 6B, 8 and 10) at the rear end of the machine. These wheels are freely journalled on the chassis for rotation about axes extending transversely of the machine. In any freely supported position of the machine the rear wheels 60 are out of engagement with the supporting surface, but by grasping rear handle 50 in its extended position, the machine may be tilted rearwardly onto wheels 60 for manually moving the machine.

In order to facilitate easy movement of the machine sideways, the handling running gear includes suitable side wheels 62 and 63 on the right side of the machine, and 64 on the left side of the machine. In the illustrated embodiment each wheel is part of a caster, and wheel 62 is part of a fixed front caster 65 mounted on the chassis so that wheel 62 rotates about an axis parallel to the side of the machine. Wheel 63 is part of a retractable right rear caster assembly 66 mounted on the chassis for movement of the caster between an operative position in which wheel 63 is generally level with wheel 62 and journalled for rotation about an axis parallel to the side of the machine, as shown by solid lines in FIG. 9, and a retracted position as shown by dotted lines in FIG. 9. When the machine is positioned on a lane on the propelling gear the front caster 65 is in the adjacent gutter. Caster 66 has a bifurcated body portion pivoted to the chassis by a pivot pin 67 parallel to the side of the chassis so that the caster may move between its retracted position to clear platform 30 when the machine is on its working running gear at foul line 33, and operative position for supporting the machine. Overcenter movement of caster 66 between its retracted and operative positions is provided by a tension spring 68 having one end connected to the chassis and the other end connected to the caster to resiliently hold the caster in either of its positions. It will be understood that when the left end of the machine is lifted by handle 52, side wheels 62 and 63 enable the machine to be wheeled about an establishment, as from a storage area to an approach area, and vice versa.

Wheels 62 and 63 are both spring mounted on their respective caster bodies (FIGS. 5B and 6B), in order to cushion the machine as it is moved about. These wheel suspensions are similar for both casters, and with reference to FIG. 6B, wheel 63 is mounted on a lever 69 pivoted intermediate its ends to the body of caster 66, and journalling wheel 63 at its outer end. This lever is connected at its inner end with an end of a tension spring 70, the opposite end of this tension spring being connected in a part 71 of the caster body.

Wheel 64 is part of a swivel caster 72 mounted on the left side of the machine intermediate the front and rear ends of the machine and received in the adjacent gutter 32 when the machine is supported on its running gear on lane 31. This caster is mounted for pivotal movement by means of a stub shaft 73 journalled in a shock absorbing rubber-like mount 74 for pivotal movement about a generally vertical axis.

Means is provided for normally retaining caster 72 oriented for rotation of wheel 64 about an axis generally perpendicular to the side of the machine, and herein this means is in the form of a tension spring 75 connected at one end with a lever 76 extending transversely of stub shaft 73, and at its other end connected with the chassis at a point defining with the center of stub shaft 73 an axis generally normal to the longitudinal axis of the machine, thus permitting swivel movement of the caster but resiliently urging the caster to its normal position as shown in FIGS. 6A and 7. It will be understood that the left wheel 64 and the previously described right side wheel means enables movement of the machine laterally, while level, as in the approach area, from one lane approach to another, and to facilitate such movement the entire machine, when handle 50 is folded down, is low enough to be moved under ball storage racks as at 34.

Working running gear for movement of the machine in operative position up and down a lane 31 is provided in the illustrated embodiment by a pair of wide wheels, one wheel 77 toward the left of the machine and another wheel 78 toward the right of the machine, both the these wheels being forward of the center of gravity of the machine, in a forward and rearward direction. In the illustrated embodiment wheels 77 and 78 provide driving wheels for propelling the machine up and down lane 31, as will be more fully described hereinafter. Tilt or pressure wheel 79, to be more fully described hereinafter, is positioned laterally between wheels 77 and 78 and rearwardly of the center of gravity in a front to rear direction of the machine. When the machine is supported on caster wheels 62, 63 and 64, or on wheels 60 of the handling running gear, wheels 77, 78 and 79 of the working running gear are out of engagement with the supporting surface.

*Guides*

Guide means is provided for accurately guiding the machine up and down the bowling alley lane 31 during operation of the machine, and is preferably adjustable in order to adapt the machine for use on various alleys, and for accurately adjusting the direction of movement of the machine so that it runs true up and down the lane. Herein the guide means is illustrated in the form of ball guides mounted at each corner of the chassis, and more particularly, a ball guide 80 at the front left corner of the machine, a ball guide 81 at the front right corner of the machine, a ball guide 82 at the left rear corner of the machine and a fourth ball guide 83 at the right rear corner of the machine. Each of these ball guides includes a spherical ball 84 freely mounted for rotation in a socket in a body member 85. Each ball guide is mounted for vertical adjustment so that the guide may properly engage the inner face of gutter 32 adjacent lane 31. Such adjustment is provided by a laterally outwardly inclined threaded shank 86 extending upwardly from the respective body 85 and received in an opening 87 in a bracket 88, one for each front guide, and 88a, one for each rear guide, suitably secured to the chassis. Nuts 89 threaded on each stem 86 on opposite sides of these brackets facilitate vertical adjustment of the ball guide. It should be noted that stems 86 of the front ball guides 80 and 81 are received in openings 87 in the form of slots elongated in a direction laterally of the machine so that these guides may be moved inwardly or outwardly to properly orient the machine as it traverses the bowling alley lane 31. In the illustrated embodiment the rear guides 82 and 83 are received in openings 87 which closely engage the respective stems 86 so that these ball guides are stationary longitudinally of the machine, but may be adjusted vertically as previously described.

The guides 80–83 are positioned on opposite sides of the machine so as to travel in the gutters along with casters 65, 66 and 72. In order that the rear end of the machine may move past the foul line when the machine is operatively positioned on a bowling alley lane 31, the rear guides 82 and 83 are retractably mounted on the chassis so that these guides clear the head ends 32a of gutters 32 as the machine returns past the foul line, as may best be seen in FIGS. 7 and 9. Rear guide brackets 88a are mounted on the chassis for movement between an operative guiding position as shown best in FIGS. 6A, 6B, 7 (in solid lines), and 9, and retracted position as shown by dotted lines in FIG. 7. To facilitate such movement, brackets 88a are freely pivoted on the chassis by a pivot pin 90 so that the bracket pivots about an axis generally parallel to the rear end of the machine.

In order to retain the rear guides in retracted position, holding means in the form of a ratchet assembly is provided for each of the rear guides. Each ratchet assembly includes a notched portion 93 on a front edge of brackets 88a, and a pawl 94. The pawl of each ratchet assembly is fixedly mounted on an adjacent end of a shaft 95 extending between the sides of the machine and having an offset portion 96 (FIGS. 5A and 8) to which is attached one end of a tension spring 97, the other end of the tension spring being connected with the chassis to urge pawls 94 toward latching position for engagement with notches 93, as shown by dotted lines in FIG. 7. The guides are in retracted position before the machine is placed in operation for movement down lane 31 from foul line 33, and as the machine begins operation down lane 31, control means, to be fully described hereinafter, causes operation of a control solenoid 98 (FIGS. 5A, 7 and 8) fixedly mounted on the chassis and having a plunger 99 on the lower end of which is fixedly secured a finger 100 which engages a finger 101 fixedly secured to shaft 95 and urges finger 101 clockwise, as viewed in FIG. 8, thereby rotating shaft 95 clockwise to move pawls 94 out of engagement with notches 93, thereby releasing the rear guides so that they may move from their retracted position to their operative guiding position as limited by cooperating abutments 91.

Each rear guide is releasably retained in operative guiding position by a generally crescent-shaped holding arm 105, one on either side of the machine, and pivoted to the chassis by a pivot pin 106 for pivotal movement about an axis generally parallel to the rear end of the machine. Cooperating abutment means 107 on each arm 105 and the respective guide bracket 88a are interlocked as the respective bracket moves into operative guiding position to hold the guide against movement to retracted position. Arms 105 are urged to such holding position by tension springs 108, one for each arm 105, and one end of the respective spring being attached to the associated arm 105 adjacent its abutment 107, and the other end being attached to the chassis, thus urging arms 105 counterclockwise as viewed in FIG. 7. As the machine moves on lane 31 back toward the foul line, it is desirable that the rear guides be retracted so that the machine may at least partially pass over foul line 33 and onto platform 30. To this end each holding arm 105 has an arcuate portion 110 depending from its pivot 106 and inclined generally downwardly toward the front end of the machine. This portion 110 engages gutter head 32a and is rotated clockwise, as viewed in FIG. 7, thus disengaging cooperating abutments 107 on the upper end of the respective arm 105 and cooperating bracket 88a so that as the respective rear guide engages gutter heads 65 it is rotated clockwise by continued movement of the machine rearwardly across the foul line thereby engaging ratchet pawl 94 with an associated ratchet notch 93 to retain the guide in retracted position.

*Propelling mechanism*

Drive means is provided for propelling the machine up and down the alley responsive to the control means to be described hereinafter. In the illustrated embodiment the drive means is in the form of a reversible electric motor 115 (FIG. 5B) which receives electric power through cord 36 as will be more fully described hereinafter. Motor 115 is suitably mounted on the chassis near the right side of the machine and has a geared output shaft driving a reduction gear train including a drive shaft 116 extending toward the left side. A toothed pulley 117 is mounted on drive shaft 116 for rotation therewith and carries a toothed belt 118 which passes around a toothed driven pulley 119 mounted on a drive wheel shaft 120 generally parallel to the front and rear ends of the machine and journalled in bearings 121 suitably secured to the chassis. Shaft 120 is sectional and, with reference to FIGS. 11A and 11B, from the left side of the machine the shaft 120 includes a section 120a which provides an axle fixed to and mounting driving wheel 77, a sleeve section 120b telescoped over section 120a and over a section 120c and fixedly secured to sections 120a and 120c as by pins 122, one extending through each of the latter sections and the sleeve section 120b. Section 120c defines an axle fixedly secured to drive wheel 78 and further mounts pulley 119 so that the drive wheels 77 and 78 are driven through belt 118 by motor 115 for propelling the machine either in a forward or reverse direction depending upon the direction of operation of the motor. If desired, means may be provided for selectively varying the speed with which the machine is driven along the bowling lane 31, as by using variable speed pulleys at 117 and 119, but such mechanism is not described in detail.

Thus, when the lane maintenance machine is operatively positioned on bowling lane 31, drive wheels 77 and 78 are driven by motor 115 through belt 118 for propelling the machine up or down the alley depending upon the direction of operation of the motor, and cooperate with wheel 79 in supporting the machine in operative position. The speed of the machine is preferably such that it moves down lane 31 and back to the foul line in about 80 to 120 seconds, for example.

*Cord handling reel*

As mentioned previously, electric power for driving motor 115 is supplied through electric cord 36 which is controlled by a reel assembly 140 as may best be seen in FIGS. 5A, 5B, 6A and 6B, and shown separately in FIG. 15. This reel assembly provides means for paying out cord 36 as the machine moves down lane 31 away from foul line 33 and for reeling in cord 36 as the machine returns toward the foul line. Cord 36 is normally wound on a reel 141 retained against axial movement and journalled for rotation on a shaft 142 which is in turn journalled for rotation in a reel housing assembly 143 suitably mounted on the chassis. Terminal ends of cord 36 are suitably connected with motor 115 through a collector ring assembly including collector rings 144 and 145, one connected with each of the terminal ends of cord 36 and riding on brush assemblies 147, one for each of the collector rings 144 and 145, only the brush for collector ring 145 being shown in section FIG. 15. These brushes are in turn suitably connected with motor 115.

A friction slip clutch assembly 150 is telescopically mounted on shaft 142 and has a pressure plate 151 seated against the right side 152 of reel 141 with a spiral compression spring 153 having one end seated against pressure plate 151 and the opposite end seated against a bushing 154 which is adjustable toward and away from the pressure plate by means of nuts 155 threaded on a sleeve 156 which is fixedly secured to shaft 142. Shaft 142 has an end connected with a conventional over-running clutch 157 in a gear box 158 mounted on the chassis along the right-hand side of the machine. Clutch 157 is driven by motor 115 through the previously mentioned gear train which is located in the gear box and includes motor gear 159. Over-running clutch gear 157 is effective to permit free wheeling of reel 141 so that cord 36 may be easily unwound from the reel as the machine moves down the alley from the foul line and laid down on the lane surface in a lazy S pattern as the unwinding cord traverses the length of the reel. When the direction of operation of motor 115 is reversed, the over-running clutch gear 157 drives shaft 142 and through clutch assembly 150 rotates reel 141 to wind cord 36 thereon. Shaft 142 is driven at a speed which assures rewinding cord 36 on reel 141, and spring pressure in coupling 150 may be adjusted to drive the reel only fast enough to rewind available cord.

*Lane conditioning mechanism*

Means for conditioning lane 31 is provided in the illustrated embodiment in the form of an assembly for applying conditioning fluid, such as a suitable liquid, to a bowling alley bed 31a and buffing the liquid on the bed. If desired, the lane may be buffed without the application of conditioning liquid.

In the illustrated embodiment the conditioning means includes a conditioning roller 165 extending across the front end of the machine and journalled on chassis side members 55 and 56 (FIGS. 5A, 5B and 7). This roller is fully described on the co-pending application of Charles R. Walbert for a "Buffer Roll Device," Serial No. 198,118, filed May 28, 1962, and reference may be had thereto. Roller 165 is detachably journalled on the chassis and is driven by a shaft 166 journalled on the right side of the chassis and detachably interlocked with the roller. One end of shaft 166 is connected with a large gear 167 in gear box 158 and driven through the gear box by motor 115.

Means is provided for moving roller 165 into and out of operative association with the surface of lane 31, and in the illustrated embodiment the chassis may be tilted foarwardly and rearwardly on its working running gear for moving the roller into engagement with lane 31 responsive to forward tilting of the chassis and out of engagement with lane 31 responsive to rearward tilting of the chassis. Such tilting of the chassis is effected in the illustrated embodiment by vertical movement of pressure wheel 79 of the working running gear (FIG. 12). Vertical movement of tilt wheel 79 is effected by mounting of the wheel on an axle 170 which is mounted intermediate the ends of a bifurcated lever 171, one end of this lever being pivotally mounted on the chassis, and more particularly connected by pivot pin 172 with a bracket 173 rigidly connected with U-shaped chassis member 57. The opposite end of lever 171 is pivotally connected by pin 175 with an end of a plunger 176 of solenoid 177 having a coil suitably mounted on the chassis. Operation of solenoid 177 is controlled by means described hereinafter. Operation of the solenoid causes lever 171 to be pivoted about its pivot pin 172 to tilt the chassis front downwardly with tilt wheel 79 remaining on lane 31.

The pressure wheel assembly should be adjusted so that when buffer roll 165 engages bed 31a the periphery of the roll is in effective engagement with the entire width of the lane. Rough adjustment is provided by cooperating stop means on solenoid plunger 176 and on a support bracket 178 secured to the chassis. Herein this means includes an abutment 179 fixedly secured to plunger 176 and a vertically adjustable abutment in the form of a threaded shank 180 having lock nuts 181 embracing opposite sides of bracket 178 to permit vertical adjustment of this shank, and therefore the overall stroke of plunger 176. Precise adjustment of tilt wheel 79 is provided by co-axial ends 185 on axle 170 on either side of this wheel, these ends being eccentric to the axis of the axle, and one end journalled in each arm of lever 171 and secured in place by nuts 186 (FIG. 5B).

Upon reference to the gear box of FIG. 13, it will be understood that buffing roll 165 is driven in the same direction as propelling wheels 77 and 78 and at a greater peripheral speed. When the roll is pressed against the lane surface it tends to propel the machine but its periphery has less tractional effect and slips relative to the lane surface while the rubber surfaced propelling wheels positively grip the lane surface and brake machine travel to the speed of the propelling wheels.

Means for applying conditioning fluid to the bed of a lane 31 is provided, and in the illustrated embodiment a suitable commercially available liquid conditioning material is preferable. As may best be seen in FIGS. 5A, 5B, 8 and 10, this means is illustrated in the form of a supply assembly 190 including an open-top trough 191 of generally V-shaped configuration and having a relatively high rear wall 192 with an upper end having a forwardly and upwardly extending flange 193 to which spring clips 194 are bolted. These clips are removably received in slots 195 in the chassis for removably attaching the trough to the chassis with the trough extending across the machine from side to side and generally parallel to the axis of roller 165. Flange 193 eliminates any possibility of spilling conditioner fluid when the machine is tilted rearwardly onto rear wheels 60 of the handling running gear.

The left end of the trough is closed by a wall 196, and the right end of the trough is secured to a sleeve 197 of a reservoir unit 198 having an enclosed tank 199 connected with sleeve 197 and an opening 200 (FIG. 8), communicating with the trough. Opening 200 is at the forward end of tank 199, and the tank is elongated with the major portion of the tank extending rearwardly from opening 200 so that when the machine is tilted rearwardly onto wheels 60, the conditioning liquid in the tank will flow to the rear end thereof, thus effectively preventing overflow of trough 191. As may best be seen in FIG. 9, the level of conditioning liquid in tank 199 is relatively low when the machine is in a generally level position on its running gear so that upon tilting the machine into storage position on its right side all conditioning liquid in trough 191 may flow into tank 199. A filler port in sleeve 197 is normally closed by a dip-stick assembly 201, and a drain opening in the right side of tank 199 is suitably closed by a removable drain cap 202.

In the illustrated embodiment of FIGS. 7 and 8, the conditioning liquid is applied to lane 31 via roller 165 by transfer means for selectively applying conditioning liquid from trough 199 to roller 165 during a predetermined period in which the machine is traversing lane 31, and if desired for applying various concentrations of conditioning fluid transversely across the lane by varying the concentrations of liquid applied axially of roller 165. With particular reference to FIGS. 5A, 5B and 8, one embodiment of this means is illustrated in the form of a pick-up roll 205 received in trough 191 and journalled at opposite ends of the trough. The pick-up roller 205 underlies a rotary metering roll or applicator brush 206 having a shaft 207 journalled at opposite ends on the trough. A body 208 extends about the shaft the length of the rotary brush and in the illustrated embodiment has three spiral dovetail grooves 209a, 209b and 209c extending the length of the brush and shaped to removably receive long narrow strip brushes 210a, 210b and 210c, respectively. Preferably, at least one of these brushes, as 210a, extends across the entire length of the rotary brush body and the other brushes 210b and 210c, if used, may extend across a limited portion of the length of the rotary brush assembly to vary the concentration of conditioning liquid picked up by the brush assembly. The rotary brush, and more particularly, its brushes as 210a, 210b and 210c, engage pick-up roller 205 and are in driving engagement with the pick-up roller for rotating this roller responsive to rotation of the rotary brush.

With reference to FIGS. 5A and 7, a driven multiple pulley unit 211 is fixedly secured to the left end of rotary brush shaft 207 and is connected by a belt 212 with a driving multiple pulley unit 213 mounted on a driven shaft 214 (FIG. 11a), as will be more fully described hereinafter. Conditioner fluid is picked up from applicator brush 206 by an applicator or transfer roller 215 and transferred to conditioner roller 165 in concentrations varying axially of roller 165 in keeping with the position of brushes 210b and 210c of the rotary brush 206.

In order to selectively start and stop application of conditioner fluid to conditioner roller 165, the applicator roller 215 is mounted on the chassis for movement between an operative position as indicated by solid lines in FIGS. 7 and 8, and an inoperative position as indicated by dotted lines in FIG. 7. When in operative position applicator roller 215 is in engagement with both the rotary applicator brush 206 and conditioner roller 165 for transferring fluid as previously described, and in inoperative position the applicator roller is out of engagement with both the brush and the conditioner roller. Means is provided mounting the brush for movement between these positions and in the illustrated embodiment this means is in the form of bell cranks 216 mounted at their centers by pivot pins 217, one at each end of trough 191, for pivotal movement about an axis generally parallel to the front end of the machine. Forward ends of cranks 216 mount opposite ends of an applicator roll journal members 218, and rear ends of these cranks are interconnected by a rigid tube 219. A finger 220 is firmly secured to and extends transversely from tube 219 intermediate the tube ends, and a tension spring 221 has one end connected with finger 220 and the other end connected with the chassis for urging the applicator roller 215 to inoperative position out of engagement with both the applicator brush 206 and the conditioner roller 165.

The upper end of control solenoid plunger 99 engages finger 220 for moving applicator roller 215 to operative position responsive to operation of solenoid 98 so that when rotary brush 206 is driven through belt 212 conditioner liquid is transferred to the conditioner roller 165. Operation of solenoid 98 to control the position of applicator roller 215 is regulated by control means to be described hereinafter.

With particular reference to FIGS. 5A and 5B, it should be noted that applicator roller 215 is preferably metal and may be provided with axially extended grooves 222 for more efficiently distributing conditioner fluid longitudinally of the roll and transferring it from brush 206 evenly to the conditioner roller 165. These grooves are preferably about 1/32" deep and 1/8" on centers circumferentially of applicator roller 215, and resist collection of fluid at the bottoms of the roll when the roll is moved out of contact with the buffer roll and transfer brush, thereby preventing subsequent application of concentrations of fluid to the buffer roll and subsequent marking of the lane surface.

It should be noted that by merely disconnecting spring 221 (modification of FIG. 8) and drive belt 212, the entire assembly including reservoir 191, tank 199, pick-up roller 200, applicator brush 206 and applicator roller 215 may be removed as a unit, and when so removing this assembly it is necessary to merely tilt it slightly toward the right side of the machine so that any fluid in trough 191 will run back into tank 199.

It should be noted that one of the primary problems involved here is that of applying proper quantities of conditioning fluid and properly distributing it on the surface of the lane. Only very minute quantities of liquid are necessary for an entire lane, on the order of one tenth of an ounce, or less, for example. The brush 206 functions as a metering roll for the purpose of transferring to the buffing roll 165 only limited quantities of liquid properly distributed longitudinally of the buffing roll. The provision of variable brushes as at 210a, 210b and 210c enables a variation in concentration of fluid laterally across the width of the lane, for example, to apply a heavier coat to the side of the lane subjected to greater use, normally the right side. The provision of multiple pulley unit 211 enables variation in the speed of rotation of brush 206 to vary the concentration of fluid longitudinally of the lane. While the metering roll has been illustrated as a brush means, it will be understood that other blade-like means such as flexible plastic may be utilized. While application of fluid is controlled by moving the applicator roll 215, it will be understood that similar control could be provided by movement of metering roll 206 and that metering roll 205 could engage buffing roll 165, obviating the need for applicator roll 206.

Control system

Automatic control of the machine is provided during normal operation by control means including the control panel 47 and a control unit 230 (FIGS. 11A, 16 and 17) which is adjusted at control panel 47 (FIGS. 2-4 and 18). Once the machine has been properly positioned at the foul line 33 of a lane 31 and is then started in operation down the lane, the control means effects operation of the machine to lower rear gutter ball guides 82 and 83 into operative position, lower conditioner roller 165 into operative engagement with lane 31 and cause applicator roller 215 to move into operative conditioner liquid transfer position. The control means further operates after travel of the machine down the bowling alley lane toward the pit a predetermined distance to move applicator roller 215 to inoperative position thus stopping the transfer of conditioner liquid to conditioner roller 165 and later to cause the conditioner roller to move out of engagement with the bowling alley lane and to stop travel of the machine toward the pit. After a short time delay the control means causes reversal of direction of the machine which then travels back toward the foul line at which time conditioner roller 165 again engages the bowling alley lane until the machine is in foul line 33 whereupon the conditioner roller is lifted out of engagement with the lane and reverse movement of the machine is stopped by operation of the control means.

As an incident to control means operation, it will be recalled that as the machine is moving past the foul line the crank arms 105 on either side at the rear end of the machine engage bowling heads 32a to release side guides 82 and 83 for movement to retracted position so that conditioner roller 165 may move closely proximate or past foul line 33 to finish buffing the alley lane 31. It should be noted that fixed stops 231 (FIG. 9) are provided for engaging gutter head 32a to positively limit movement of the machine off of lane 31.

Control panel

Before proceeding with a description of control unit 230, it should also be noted (as in FIGS. 3 and 18) that control panel 47 is provided with three dials including a dial 232 indicating the distance from the foul line 33 at which conditioner liquid will start to be applied to lane 31, a dial 233 indicating the distance from the foul line at which conditioner fluid will stop being applied to lane 31, and dial 234 indicating the distance the machine will travel down lane 31 before stopping and reversing its direction to travel back to foul line 33. Each dial includes an index 235 simulating a bowling lane 31 with the foul line at the left end and bowling pin spots at the right end, and feet gradations therebetween. Each dial also has a pointer 236 adjustable across the index responsive to operation of a control knob 237, one for each of the dials. These knobs are journalled on control panel 47 and each carries a pinion 238 which drives an associated rack 239 mounted on panel 47 in a suitable manner for sliding movement longitudinally of its respective dial 232, and to which the respective pointer 236 is attached.

In addition to master control switch 40 on anchor 37, a second master control switch 240 is provided on control panel 47, and this switch is useful in stopping the machine during a normal operating cycle. Control panel 47 also includes a start push button 241 and a reverse push button 242 along with an indicator lamp 243 illuminated only when electric power is available in supply line cord 36, and a lamp 244 illuminated only when conditioner roller 165 is being provided with conditioner liquid, that is, when applicator roller 215 is in operative position.

Control unit

Suitably mounted sheathed cables 250 are connected at one end, one to each of the rack members 239, and at an opposite end have their sheaths secured to a housing 251 of control unit 230 and the adjacent ends of their cables suitably connected respectively to adjusters 251a, 251b and 251c, respectively, for switch actuators 252, 253 and 254 corresponding respectively to dials 232, 234 and 235, respectively, so that the actuators may be pivoted on their supports and adjusted longitudinally by the cables. A fourth actuator 255 is permanently adjusted in the control unit to stop reverse travel of the machine at foul line 33. In the illustrated embodiment each of these actuators is elongated and has a pair of axially spaced journal portions 256 receiving a shaft, and more particularly actuators 252 and 253 are journalled on a shaft 257, and actuators 254 and 255 are journalled on a shaft 258, these shafts being parallel to each other and firmly secured in housing 251. Actuator 255 has an ear 259 which rests on a portion of the housing to maintain the actuator in a normal generally level position for pivotal movement upwardly on its journal. Adjusters 251a and 251b are slidable on shaft 257, and adjuster 251c is slidable on shaft 258. Adjuster 251a is retained against rotation by interlock with a guide 261, and adjusters 251b and 251c are retained against rotation by interlock with a square shaft 260. Actuators 252-255 are so interrelated that they provide cooperating stops to prevent setting the "conditioner-off" dial 233 for a setting from the foul lines less than the "conditioner-on" dial 232, or to permit setting either the "conditioner-on" or "conditioner-off" dials 232 and 233, respectively, for a distance less than the setting of the travel dial 234.

Four electric switches 262–265 (FIGS. 11A, 17 and 19) are associated, one with each of the actuators 252–255, respectively. Upward pivotal movement of an actuator operates its associated switch, and such upward pivotal movement is effected by an actuating nut 270 threadedly received on a shaft 271 journalled in the housing 251 and parallel to shafts 257, 258 and 260. This nut has a straight actuating portion 272, and responsive to rotation of shaft 271 the actuating portion moves longitudinally of the shaft and serially engages lobes 273 of the actuators 252–255 in predetermined, spaced sequence corresponding to adjustment of the actuators by cables 250 and the preset adjustment of actuator 255. With reference to FIG. 11A, it will be seen that the movement of actuator nut 270 to the left is limited by a stop-pin 274 on shaft 271, and when the nut is at this stop-pin the nut position corresponds to the foul line position of the machine. A second stop-pin 275 at the right end of shaft 271 limits movement of actuator nut 270 toward the right and corresponds to the pit end of lane 31.

Shaft 271 is coupled at its inner end to drive wheel shaft 120, and more particularly to section 120a thereof, by a suitable slip clutch 276 which permits drive shaft 120 to continue to rotate without rotating threaded shaft 271 in the event the nut becomes jammed against stops 274 or 275. In the illustrated embodiment this slip clutch is in the form of a sleeve 277 non-rotatably and axially movably mounted on the right end of shaft 271 as by a pin fixed to the shaft and extending into axial slots in the sleeve. A compression spring 278 is seated against housing 251 and more particularly against a bushing 278a (FIG. 11A) seated against a bearing on the housing, and against a shoulder 278b on the sleeve and urging a notch 279 in the right end of the sleeve shoulder 278b against a second pin 280 fixed on the left end of drive wheel shaft section 120a. Shaft 214 which mounts the drive pulley 213 for actuator roller 215 is axially connected with the left-hand end of shaft 271 and may be formed integrally therewith, if desired.

In order to assure precise operation of switches 262–265, these switches are pivotally mounted on a shaft 282 firmly mounted on the housing 251 and generally normal to shafts 257, 258 and 260. Each switch is provided with a tension spring 283 suitably secured at its lower end to the respective switch at a point spaced from shaft 282, and at its upper end to a bracket 284 firmly secured to housing 251. A set-screw 285 is threadedly mounted on a support 286 firmly secured to housing 251 and is threadedly adjustable upwardly and downwardly to pivot switches 262–265 so that a push button type switch actuator 287 of the respective switch may be moved vertically with respect to its respective actuator.

Circuit and operation

To briefly summarize the features and operation of the machine, it should be noted that the machine may be moved about in an inclined position on right side caster wheels 62 and 63, or in a level position also resting on left side caster wheel 64. In order to properly position the machine at the foul line end of a bowling alley lane 31, the machine may be tilted rearwardly by retractable handle 50 onto wheels 60. After the machine has been manually positioned at the foul line end of the bowling alley, the right rear caster wheel 63 is manually retracted and the right front caster wheel 62 and left caster wheel 64 are received in adjacent gutters 32. Rear gutter guides 82 and 83 are normally held retracted, in inoperative position; the front guides 80 and 81 are received in adjacent gutters 32 with the machine resting on its working running gear including drive wheels 77 and 78 and tilt wheel 79.

With anchor 37 properly in position on platform 30 and its switch 40 in "on" position, switch 240 of control panel 47 is turned on. Control knobs 237 are adjusted to set dials 232–234 for the desired operation of the machine, and more particularly dial 232 is set to determine the distance from the bowling alley foul line 33 at which solenoid 177 will be operated to cause the chassis to tilt forwardly and conditioner roller 165 to engage lane 31. Dial 233 is set for a distance from the foul line greater than dial 232, at which distance solenoid 98 will be operated so that conditioner liquid will be applied to conditioner roller 165 and rear guides 82 and 83 will be dropped into engagement with gutters 32. Dial 234 is set to determine the total distance the machine will move down lane 31 before stopping and reversing to return to the foul line.

After the dials have been properly set, "start" push button 241 may be depressed to start the machine in operation. Referring to the circuit of FIG. 19, it will be seen that closure of switch 241 effects energization of control relay 1CR through normally closed contacts 2TCR–B and normally closed "travel" switch 264. Energization of relay coil 1CR effects closure of its normally open contacts 1CR–B thereby providing a holding circuit for maintaining the coil energized. Energization of the coil also effects closure of its normally open contacts 1CR–A providing for energization of a coil 3CR, effecting closure of switch contacts 3CR–A and opening of contacts 3CR–B. Contacts 1CR–D and 1CR–F are closed, while contacts 1CR–E and 1CR–G are opened. Contacts 1CR–C are opened so that coil 2TCR may not be energized upon closure of "foul line" switch 265 when the machine leaves the foul line.

It will be understood that energization of the coils 1CR and 3CR provides for energization of the drive motor 115 forwardly, initiating travel of the machine from the foul line toward the pit end of the alley. Closure of contacts 3CR–A also results in energizing coil 4TCR which, after a predetermined time delay on the order of approximately one second, effects closure of contacts 4TCR–A, providing for energization of coil 5CR which in turn effects closure of contacts 5CR–A to energize the solenoid 177 thereby to actuate the pressure wheel and lower the buffing roll into engagement with the surface of the lane after the machine has started moving and the roll has started rotating.

After a predetermined travel of the machine, "fluid-on" switch 262 is closed, energizing the solenoid 98 which initiates transfer of conditioner fluid from the supply trough to the buffer roll and thence to the lane surface. After the predetermined length of travel previously selected, the "fluid-off" switch 263 is opened, de-energizing solenoid 98 and terminating transfer of fluid from the supply trough to the buffer roll.

Even though fluid may be applied to only a limited length of the lane surface, or some length less than the total length, the machine may still be set to travel substantially the entire length, or some distance in excess of the length to which conditioner fluid is applied. At the end of such predetermined travel, "travel" switch 264 is opened, de-energizing coil 1CR.

De-energization of the coil 1CR results in opening contacts 1CR–A, de-energizing coil 3CR and opening contacts 3CR–A. As a result, coil 4TCR is de-energized and contacts 4TCR–A open. Coil 5CR is de-energized, contacts 5CR–A are opened and pressure wheel solenoid 177 de-energized in order to immediately lift the buffer roll from the lane surface prior to completion of machine travel which is also terminated by de-energization of motor 115 when contacts 3CR–A open.

De-energization of coil 1CR results in closure of normally closed contacts 1CR–C, energizing coil 2TCR through the "foul line" switch 265 which is closed except when the machine is at the foul line. After a predetermined time delay, which may be on the order of five seconds, contacts 2TCR–A are closed to energize the coil 3CR, again closing contacts 3CR–A to energize motor 115 reversely, normally closed contacts 1CR–E and 1CR–G being closed and normally open contacts 1CR–D and 1CR–F being open by virtue of de-energization of coil 1CR.

Upon return of the machine to the foul line, switch 265 is opened, de-energizing coil 2TCR, opening contacts 2TCR–A, de-energizing coil 3CR and opening contacts 3CR–A thereby to de-energize pressure solenoid 177 and drive motor 115, immediately lifting the buffing roll, after which machine travel ceases.

During return of the machine toward the foul line, there is no transfer of fluid from the trough to the buffing roll since, even though switches 262 and 263 are actuated, these are isolated from the circuit by normally open contacts 1CR–B, then open contacts 2TCR–B, and "start" switch 241.

If it is desired to operate the machine without applying conditioner liquid, it is merely necessary to remove belt 213 which drives applicator brush 206 so that no liquid will be transferred to conditioner roller 165.

We claim:

1. In a bowling lane conditioning machine, a chassis, means on the chassis including a drive motor providing a power source, means on the chassis supporting the same for movement along a bowling lane surface including traction wheels driven by said power source and engageable with the lane surface for determining the rate of advance of the chassis along the lane, a combination fluid application and lane buffing roller journaled on said chassis and driven by said power source for rotation at a predetermined rate relative to the rate of said traction wheels to buff the lane surface, a conditioner fluid supply assembly including a trough mounted on said chassis, a pick-up roller rotatably mounted within said trough, a rotary fluid transfer means in fluid transfer association with said pick-up roller and said buffing roller including a metering roller comprising a thin brush providing only a fractional roll periphery for limited fluid transfer and means connecting said metering roller and said power source to rotate the metering roller in timed relation with rotation of the traction wheels.

2. The machine of claim 1 including means for varying the speed of the metering roller relative to the speed of the traction wheels to vary the concentration of fluid applied to the lane surface.

3. In a machine for treating the surface of a bowling lane having gutter means at opposite sides thereof, a chassis, first wheel means on the chassis engageable with the lane surface for supporting the chassis for movement longitudinally forwardly and rearwardly along the lane, means on the chassis for treating the surface of the lane as the chassis moves therealong, second wheel means laterally outwardly disposed on the chassis relative to the first wheel means at opposite sides of the chassis for supporting the chassis for movement laterally when the machine is off the lane and disposed over the gutter means when the machine is on the lane, such second wheel means being mounted to rotate about an axis extending in a front-to-rear direction and having lower portions below lower portions of the first wheel means, and means on the chassis swivelly mounting the second wheel means disposed at one side of the chassis.

4. In a bowling lane conditioning machine, a chassis, a buffing roller journalled on said chassis, a conditioner fluid supply assembly including a trough mounted on said chassis, a pick-up roller rotatably mounted within said trough, a transfer roller in fluid transfer association with said buffing roller, and a metering roller in fluid transfer engagement with said pick-up roller and said transfer roller, wherein said trough, pick-up roller, transfer roller and metering roller define a unit assembly removably mounted on said chassis.

5. In a bowling lane conditioning machine, a chassis, a buffing roller journalled on said chassis, a conditioner fluid supply assembly including a trough mounted on said chassis, a pick-up roller rotatably mounted within said trough, a transfer roller in fluid transfer association with said buffing roller, a metering roller in fluid transfer engagement with said pick-up roller and said transfer roller, and means for moving one of the last two mentioned rollers into and out of fluid transfer engagement.

6. The machine of claim 5 wherein the last recited means comprises means for moving said transfer roller into and out of fluid transfer engagement with the metering roller.

7. The machine of claim 6 wherein said last recited means comprises mounting means supporting the transfer roller for movement between a first position in fluid transfer engagement with the metering roller and buffing roller and a second position out of engagement with both the transfer roller and buffing roller.

8. The machine of claim 6 wherein said moving means comprises crank means rotatably carrying said transfer roller, said crank means being journalled for swinging movement of said transfer roller into and out of fluid transfer position, and means for operating said crank means.

9. The machine of claim 8 wherein the last said means comprises a solenoid mounted on said chassis and having a plunger operatively connected with said crank means.

10. In a machine for treating the surface of a bowling lane, a chassis, a shaft rotatably supported on the chassis, wheel means on the shaft engageable with the lane surface for supporting and propelling the chassis along the lane, selectively reversible means on the chassis for driving said shaft forwardly and reversely, means on the chassis for selectively treating the surface of the lane as the chassis moves therealong, and means for automatically controlling operation of one of said drive means and said treating means including a threaded portion on said shaft driven proportionately with said wheel means, an actuating nut threadably mounted on said threaded shaft portion, means on the chassis preventing rotation of the nut for causing movement of the nut along the shaft responsive to rotation of the shaft, and switch means operable by said nut and controlling said one means.

11. A machine as defined in claim 10 including switch means operable by said nut and controlling both of said drive means and said treating means.

12. A machine as defined in claim 11 wherein the switch means comprises a first switch for reversing said drive means after predetermined forward travel of said chassis from a lane foul line toward the lane pit, a second switch for initiating operation of said treating means during forward travel of the machine, and third means for stopping operation of said treating means during forward travel of the machine.

13. In a machine for treating the surface of a bowling lane, a chassis, a shaft rotatably supported on the chassis, wheel means on the shaft engageable with the lane surface for supporting and propelling the chassis along the lane, selectively reversible means on the chassis for driving said shaft forwardly and reversely, means on the chassis for selectively treating the surface of the lane as the chassis moves therealong, and means for automatically controlling operation of one of said drive means and said treating means including a threaded portion on said shaft driven proportionately with said wheel means, an actuating nut threadably mounted on said threaded shaft portion, means on the chassis preventing rotation of the nut for causing movement of the nut along the shaft responsive to rotation of the shaft, switch means controlling said one means and switch actuating means operable by said nut for actuating said switch means comprising an actuator pivotally mounted about an axis parallel to said threaded shaft and having a switch actuating portion engageable with said switch means.

14. A machine as defined in claim 13 including a shaft mounting said switch actuator for pivotal movement about said axis and adjusting movement longitudinally of said axis, and adjusting means for the switch actuator including a remotely located manually accessible knob and motion transmitting means connecting said knob and actuator.

15. The machine of claim 1 including means for selectively interrupting the fluid transfer association of said rotary fluid transfer means relative to one of the pick-up roller and buffing roller.

References Cited by the Examiner
UNITED STATES PATENTS

| | | | |
|---|---|---|---|
| 505,064 | 9/93 | Sawyer | 318—468 X |
| 786,809 | 4/05 | Hertzog | 318—468 X |
| 1,600,546 | 9/26 | Jenkins | 15—230 X |
| 1,935,158 | 11/33 | Lumley | 15—319 |
| 2,253,170 | 8/41 | Dunham | 318—207.2 X |
| 2,878,502 | 3/59 | Johnson | 15—183 |
| 3,017,648 | 1/62 | Wilson et al. | 15—50 |
| 3,042,950 | 7/62 | Ludwig et al. | 15—50 |
| 3,083,390 | 4/63 | Wroten | 15—103.5 |

CHARLES A. WILLMUTH, *Primary Examiner.*

WALTER A. SCHEEL, *Examiner.*